(12) United States Patent
Cozzo et al.

(10) Patent No.: US 7,558,533 B2
(45) Date of Patent: Jul. 7, 2009

(54) PARAMETER ESTIMATE INITIALIZATION USING INTERPOLATION

(75) Inventors: Carmela Cozzo, Cary, NC (US);
Gregory Bottomley, Cary, NC (US);
Rajaram Ramesh, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 11/936,193

(22) Filed: Nov. 7, 2007

(65) Prior Publication Data

US 2008/0063045 A1    Mar. 13, 2008

Related U.S. Application Data

(63) Continuation of application No. 10/953,010, filed on Sep. 29, 2004, now abandoned.

(51) Int. Cl.
*H04B 15/00* (2006.01)
(52) U.S. Cl. .......................... 455/65; 455/137
(58) Field of Classification Search ................. 455/504, 455/506, 65, 67.16, 132, 137; 375/150, 142, 375/343, 347; 370/342
See application file for complete search history.

(56) References Cited

U.S. PATENT DOCUMENTS

| | | | |
|---|---|---|---|
| 6,363,104 B1 | 3/2002 | Bottomley | |
| 6,507,602 B1 | 1/2003 | Dent | |
| 6,560,273 B1 | 5/2003 | Sourour | |
| 6,560,448 B1 | 5/2003 | Baldwin | |
| 6,977,961 B1 * | 12/2005 | Eryurtlu | 375/240.02 |
| 7,263,376 B2 * | 8/2007 | Bohnhoff | 455/502 |
| 7,317,760 B2 * | 1/2008 | Jeong et al. | 375/260 |
| 2005/0047485 A1 | 3/2005 | Khayrallah | |
| 2005/0069023 A1 | 3/2005 | Bottomley | |

OTHER PUBLICATIONS

"A Generalized RAKE Receiver for Interference Suppression" Aug. 2000, IEEE Journal on Selected Areas in Communications, IEEE Inc. New York, US, pp. 1536-1545, XP002003546 ISSN: 0733-8716 the whole document.
Wang Hai, et al., Approaches for fast, adaptive, generalized rake reception, Research Disclosure Journal, No. 475041, Kenneth mason Publications Ltd., Nov. 2003.
Frederik Petre, et al., Pilot-aided Adaptive Chip Equalizer Receiver for Interference Suppression in DS-CDMA Forward Link, Proc. IEEE Vehicular Technology Conference, Boston, MA, Sep. 24-25, 2000.

* cited by examiner

*Primary Examiner*—Nguyen Vo
(74) *Attorney, Agent, or Firm*—Roger S. Burleigh

(57) ABSTRACT

A receiver is described herein that is capable of receiving and processing a radio signal and further capable of using interpolation to initialize receiver parameters when there is a change in at least one delay associated with the received radio signal or when there is at least one new correlator position. For instance, the receiver parameters that can be initialized include: (1) channel coefficients; (2) AFC parameters; (3) tracking parameters; (4) noise statistics (noise correlations); (5) signal statistics (channel coefficient correlations); (6) data statistics (despread values or chip samples); or (7) combining weights.

29 Claims, 7 Drawing Sheets

PARAMETER ESTIMATE INITIALIZATION USING INTERPOLATION

CROSS-REFERENCE TO RELATED APPLICATIONS

This application is a continuation of U.S. application Ser. No. 10/953,010, filed Sep. 29, 2004, now abandoned, the disclosure of which is incorporated herein by reference.

BACKGROUND OF THE INVENTION

1. Field of the Invention

The present invention relates in general to the wireless telecommunications field and in one exemplary embodiment to a receiver that receives a signal and estimates signal delays associated with the received signal and when there is a new signal delay then the receiver uses interpolation to estimate an initial value of a parameter (e.g., channel coefficient, tracking parameter) associated with the new signal delay.

2. Description of Related Art

In direct-sequence code-division multiple-access (DS-CDMA) systems, such as WCDMA and IS-2000, coherent RAKE receivers are commonly used. This type of receiver often estimates a channel response which consists of path delays and channel coefficients. The receiver also uses despread values to search for signal paths. Based on all of this information, the receiver positions its correlators or "fingers" at certain delays. As these delays change over time, the receiver needs to move the fingers to different positions. Every time a new finger position is used, the receiver needs to initialize a channel coefficient or some other parameter like channel tracking parameters, automatic frequency correction (AFC) quantities, noise correlations and fading correlations. The last two parameters are needed for advanced receivers like G-RAKE receivers or joint scaling receivers.

A traditional approach that can be used by a receiver to initialize a channel coefficient after a finger is moved to a new position is one that uses prior knowledge of the channel in a nearby position. In this approach, the receiver considers the distance between the new finger position provided and the closest finger delay to the new position in a delay tracker. If the distance is less than ¼-chip period, it is assumed that the finger has not moved much and the old channel coefficient is kept. For larger distances, the channel coefficient in the new position is set to zero, or its value is computed by scaling an initial, noisy measured value. This approach is described in U.S. Pat. No. 6,560,273 entitled "Delay Searcher and Delay Trackers Interaction for New Delays Assignment to RAKE Fingers". The contents of this patent are incorporated herein.

Although this approach works well it does have a potential shortcoming in that the accuracy of the initial channel coefficient estimates may not be good enough to ensure a reliable channel estimate and/or provide a fast enough convergence. And, if the initial values of these initialized channel coefficient estimates (or other parameters) are not good enough, then there can be a transient loss in performance while the receiver develops better estimates of the initial channel coefficients. Accordingly, there is a need for a receiver that addresses the problem of initialization of a channel coefficient (or other parameters) when there is a new signal delay or when a finger is moved to a new position. This need and other needs are satisfied by the receiver of the present invention.

SUMMARY OF THE INVENTION

The present invention includes a receiver that is capable of receiving and processing a radio signal and further capable of using interpolation to initialize receiver parameters when there is a change in at least one delay associated with the received radio signal or when there is at least one new correlator position. For instance, the receiver parameters that can be initialized include: (1) channel coefficients; (2) AFC parameters; (3) tracking parameters; (4) noise statistics (noise correlations); (5) signal statistics (channel coefficient correlations); (6) data statistics (despread or received sample correlations); or (7) combining weights (for combining despread values or chip samples).

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1-15, there is disclosed a receiver 100 that uses different types of interpolations to develop estimates of initial receiver parameters like channel coefficients, channel tracking parameters, AFC quantities, noise correlations, fading correlations, data correlations and combining weights. Although the receiver of the present invention is described as being in the form of a RAKE receiver (RAKE, G-RAKE, joint scaling receiver) or chip equalizer, it should be understood that the present invention applies to any type of receiver that estimates signal delays. Accordingly, the receiver 100 should not be construed in such a limited manner.

Figure 1:
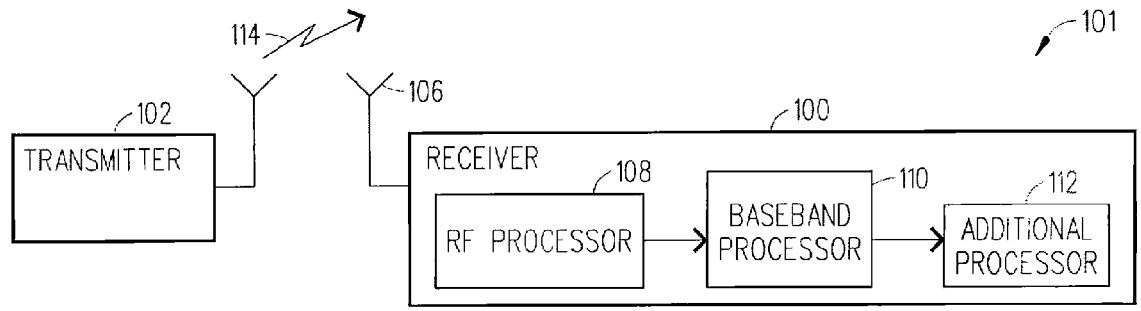
FIG. 1 is a block diagram of a wireless communication system that includes a transmitter and a receiver which is configured in accordance with the present invention.

FIG. 1 is a block diagram of a wireless communication system 101 that includes a transmitter 102 (only one shown) and a receiver 100 (only one shown) which is configured in accordance with the present invention. As shown, the transmitter 102 transmits a radio signal 114 that passes through a channel and is received by an antenna 106 of the receiver 100. The receiver 100 also includes a radio frequency (RF) processor 108 which processes the received radio signal and a baseband processor 110 which converts the processed received radio signal into a baseband signal 104 that is further processed by an additional processor 112.

Figure 2:
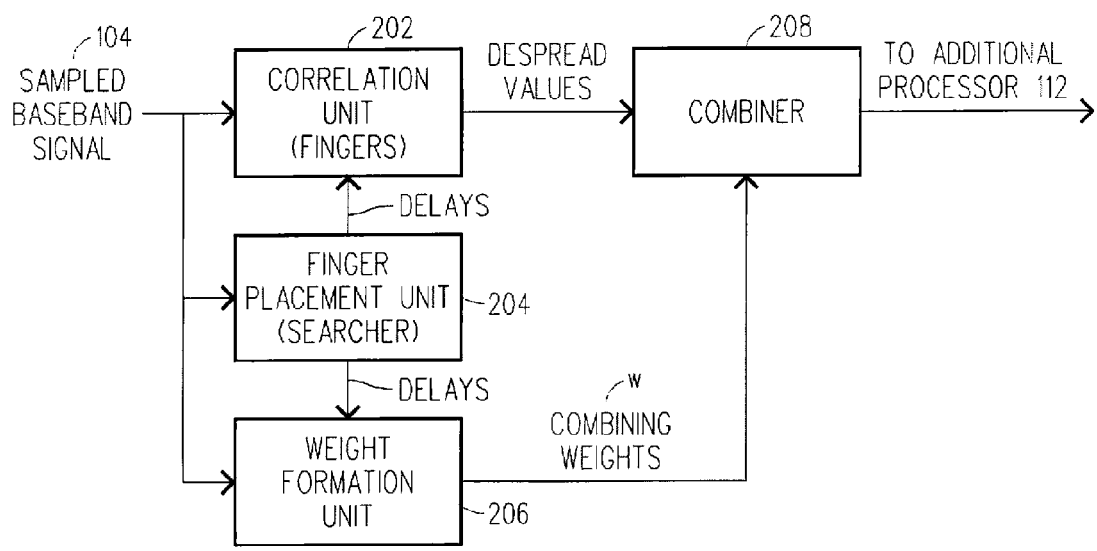
FIG. 2 is a diagram that illustrates in greater detail the components within a baseband processor in the receiver shown in FIG. 1.

FIG. 2 is a diagram that illustrates in greater detail the different components within the baseband processor 110. The baseband processor 110 includes a correlation unit 202 (fingers 202), a finger placement unit 204 (searcher 204), a weight formation unit 206 and a combiner 208. In DS-CDMA RAKE reception (for example), the correlation unit 202 extracts different signal images from the baseband signal 104 and performs a despreading operation on the different signal images. To perform the despreading operation, the correlation unit 202 uses delays or finger positions that are provided by the finger placement unit 204. The finger placement unit 204 determines the delays or finger positions for each signal image at a predetermined rate. And, depending on the fading conditions the estimated delays made by the finger placement unit 204 may change even if the true delays do not. The combiner 208 combines the despread values received from the correlation unit 202 by using combining weights provided by the weight formation unit 206. In general, the combining weights depend on estimates of the channel coefficients of the radio channel. The combiner 204 then sends the combined values to the next processor 112. The present invention focuses on the weight formation unit 206.

Figure 3:
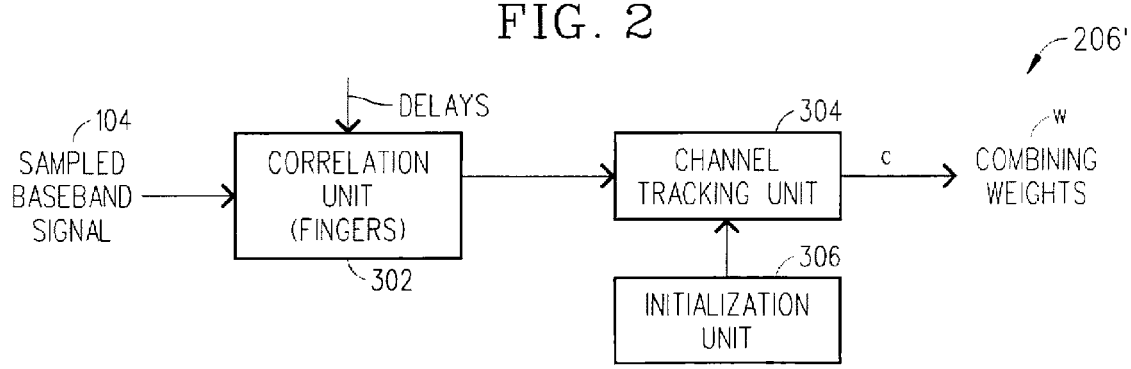
FIG. 3 is a diagram that illustrates in greater detail the components within one embodiment of a weight formation unit in the baseband processor shown in FIG. 2.

FIG. 3 is a diagram that illustrates the components within one embodiment of a weight formation unit 206' used within a RAKE receiver 100. The weight formation unit 206' includes a correlation unit 302, a channel tracking unit 304 and an initialization unit 306. The correlation unit 304 receives the delay values from the finger placement unit 204 and correlates to the pilot signals in the baseband signal 104 so it can send the despread values to the channel tracking unit 304. Thereafter, the channel tracking unit 304 estimates the channel coefficients for each finger. If w denotes the combining weights and c denotes the channel estimates given by the channel tracking unit 304, then:

$$w=c.$$

Due to the effect of noise and fading, as well as motion of the receiver 100, the transmitter 102 and/or scattering objects, the positions of the fingers change over time. Repositioning of fingers happens because the channel actually changes and/or the channel is unchanged but the finger placement unit 204 (searcher 204) assigns new positions. When a finger is assigned a new position, the initialization unit 306 needs to determine and provide the initial value of the channel coefficient.

Figure 4:
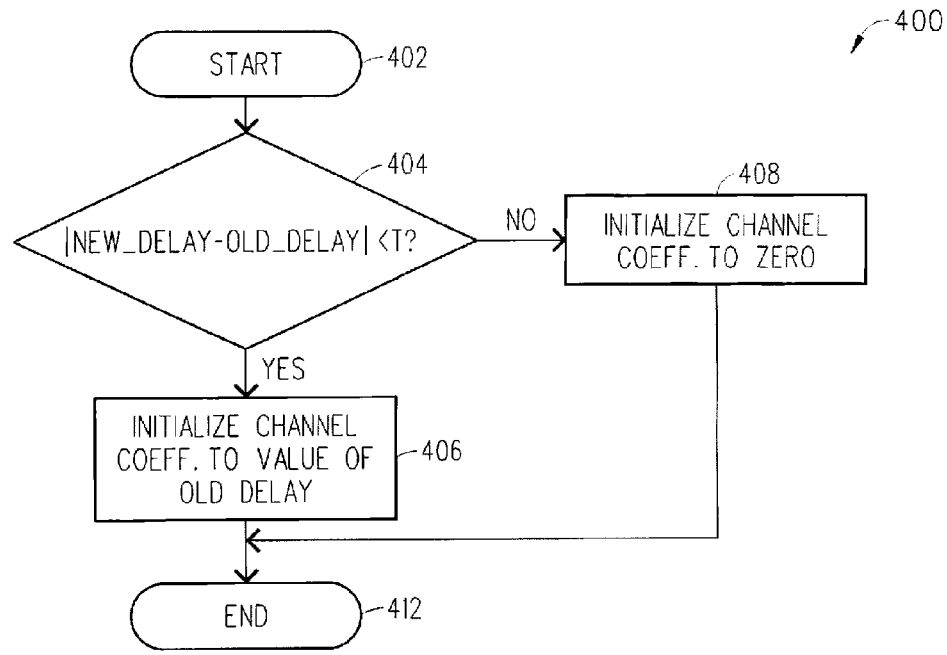
FIG. 4 (PRIOR ART) is a flowchart that shows the steps of a traditional method that can be used to initialize a channel coefficient within the weight formation unit shown in FIG. 3.

FIG. 4 (PRIOR ART) is a flowchart that shows the steps of a traditional method 400 that the initialization unit 306 can use to initialize the channel coefficient. The process starts at step 402 and then at step 404 a new finger position is compared to the closest old or existing finger. If the relative distance is less than a specified value (for example ¼-chip period), then at step 406 the channel tracking unit 304 is initialized to the channel value of the old finger because it is assumed that the finger has not moved. If the distance is larger then the specific value, then at step 408 the channel tracking unit 304 is initialized to zero. The process ends at step 412. For a more detailed description about this traditional method 400 reference is made to the aforementioned U.S. Pat. No. 6,560,273.

Figure 5:
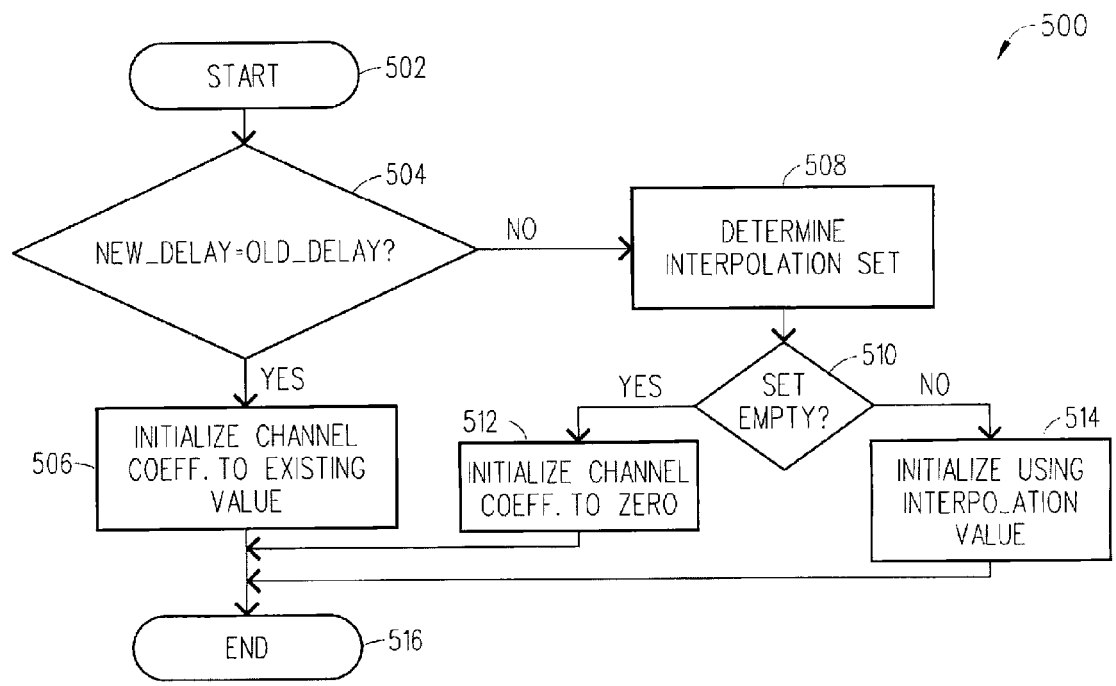
FIG. 5 is a flow chart that shows the steps of a method that can be used within the weight formation unit shown in FIG. 3 to initialize a channel coefficient for a new finger position by using interpolated values from old or prior finger positions in accordance with one embodiment of the present invention.

FIG. 5 illustrates a flow chart that shows the steps of a method 500 that the initialization unit 306 can use to initialize the channel coefficient for new fingers using interpolated values from old or prior finger positions in accordance with one embodiment of the present invention. The process starts at step 502 and then at step 504 the new finger positions are compared with the old finger positions. If the position has not changed, then at step 506 the same channel coefficient is kept and tracking of the channel continues. If the position is different, then at step 508 a set of old positions is defined depending on the relative distance between the old and new finger positions. A determination is then made at step 510 as to whether the set is empty. If this set is empty, then at step 512 the channel is initialized to zero or some other form of prior art initialization may be performed. If the set is nonzero, then at step 514 the channel is initialized to a value obtained by the interpolation or extrapolation of the channel coefficients of the old finger positions in the set, referred to herein as the "interpolation set". The process ends at step 516.

Although the method 500 of the present invention can be used with any finger placement strategy that is implemented by the finger placement unit 204 (searcher 204), it is particularly useful when the searcher 204 has the ability to use two strategies and can switch from one strategy to the other depending on the channel conditions, and/or system environment. For example, the searcher 204 could use a peak-based approach when in softer handoff and a grid-based approach otherwise. It should be noted that regardless of the finger placement strategies implemented by the searcher 204, when the searcher 204 changes strategies some of the fingers are going to be in new positions which means that one needs to initialize the parameters for all of the new positions. Exemplary finger placement strategies are described in U.S. patent application Ser. No. 10/653,679 entitled "Method and Apparatus for Finger Placement in a RAKE receiver". The contents of this document are incorporated by reference herein.

Figure 6:
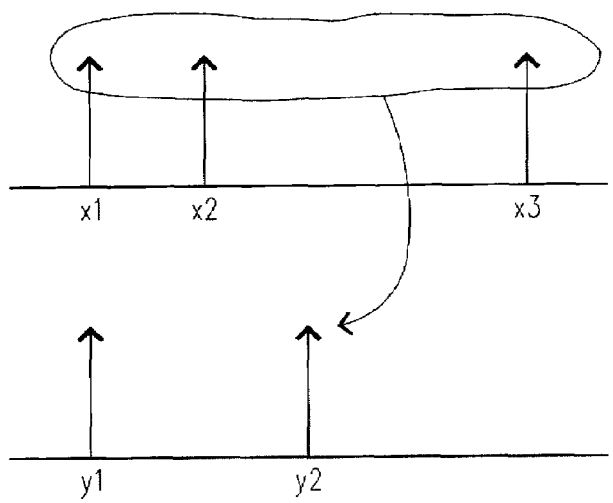
FIG. 6 is a diagram that illustrates an example used to help describe the different types of interpolation methods that can be used in the present invention.

FIG. 6 is a diagram that illustrates an example used to help describe some of the different types of interpolation methods that can be used in the present invention. In the example, the old fingers positions are x1, x2 and x3, and the new finger positions are y1 and y2. Clearly, the channel tracking unit 304 for the channel in position y1 would be initialized to the estimate of position x1 since the finger has not moved. For y2, the channel tracking unit 304 is initialized with an interpolated value given by the channel coefficients of the two adjacent old fingers (x2 and x3) or of all three old fingers (x1, x2 and x3). In general, the length of the region over which to perform interpolation is predefined, for example it can be equal to one or two chip periods. If a new finger position is farther apart than the specified distance from any old finger position, the initial value can be set to zero. In the example of FIG. 6, assume the interpolation over a set of old finger positions x2 and x3 provides the initial value for the channel coefficient of the new finger in position y2. As such, the interpolation set includes the old finger positions x2 and x3 and the values of the channel coefficients for x2 and x3 are h(x2) and h(x3), respectively.

One interpolation method that can be used to compute the initial channel estimate for the new finger position y2 is linear interpolation. In this case, the interpolated value of the new finger is:

$$h(y2)=(y2-x3)h(x2)/(x2-x3)+(y2-x2)h(x3)/(x3-x2).$$

Another interpolation method that can be used to compute the initial channel estimate for the new finger position y2 is Wiener interpolation. If h indicates the vector of the channel coefficients of fingers belonging to the chosen set of old finger positions (in this example $h=[h(x1)\ h(x2)]^T$), and G indicates the vector of the filter coefficients, the channel coefficient of the new finger y2 is:

$$h(y2)=G^H h,$$

with $G=(R_{hh})^{-1} r_{hh(y2)}$, where $r_{hh(y2)}$ is the correlation vector between the conjugate of the channel response at y2 and the set of channel responses at the old finger positions, and $R_{hh}$ is the covariance matrix of the set of channel coefficients of the old finger positions. In this case, to obtain the coefficients of the filter (entries in vector G), the correlation function of the channel has to be estimated. And, then the correlation vector can be obtained by interpolating values in the covariance matrix that corresponds to nearby delays.

One way that the covariance matrix can be estimated is to use channel coefficient estimates, as described in U.S. patent application Ser. No. 10/672,127 entitled "Method and Apparatus for RAKE Receiver Combining Weight Generation". The contents of this document are incorporated by reference herein.

Another interpolation method is to use a simpler approach that is based on estimating the "medium" response of the old finger positions and then using the knowledge of the pulse shape "ringing" to sum the responses of these signal images at the new position. For instance, if h indicates the vector of the channel coefficients of fingers belonging to the chosen set of old finger positions (in this example $h=[h(x1)\ h(x2)]^T$), and B is a matrix that depends only on the chip pulse shape, the medium response for the old fingers is:

$$g=B^{-1}h,$$

where B is a square matrix depending on how many fingers are in the interpolation set (length of g). If p(t) indicates the chip pulse shape, then the elements of the B matrix are approximated by elements of the chip pulse shape autocorrelation function $r_p(xi-xj)$, where i and j are the indices of the old fingers. As such, the channel response in a new position, for example y2, is given by the contribution of paths each of which are weighted by a coefficient that depends only on the chip pulse shape autocorrelation (elements of the matrix A in the next equation). The value of the channel in y2 is then:

$$h(y2)=Ag,$$

where, like B, the elements of A are given by $r_p(y2-xj)$. The A matrix has 1 row, and the number of columns depends on the number of old finger positions used for interpolation.

For a traditional RAKE receiver, the channel coefficient estimates are used as the combining weights. Thus, interpolating channel coefficient estimates is the same as interpolating combining weights in this case. In FIG. 3, these combining weights are formed by despreading pilot symbols and performing channel tracking. As described in the incorporated U.S. Pat. No. 5,572,552, it is possible to track the combining weights directly using an adaptive filter, such as a least mean-squares (LMS) or recursive least squares (RLS) filter. When new finger delays are introduced, interpolation can be used to interpolate these combining weights to obtain initial weight values at the new finger delays.

A description is provided next where noise statistics, fading statistics and data statistics are estimated as well as channel coefficients. For instance, a noise covariance matrix and/or the channel covariance matrix will need to be estimated if an advanced receiver 100 is used such as a G-RAKE receiver 100 (see U.S. Pat. No. 6,363,104) or a joint scaling receiver 100 (see U.S. patent application Ser. No. 10/672,127). The present invention addresses the initialization of such covariance matrices.

Figure 7:
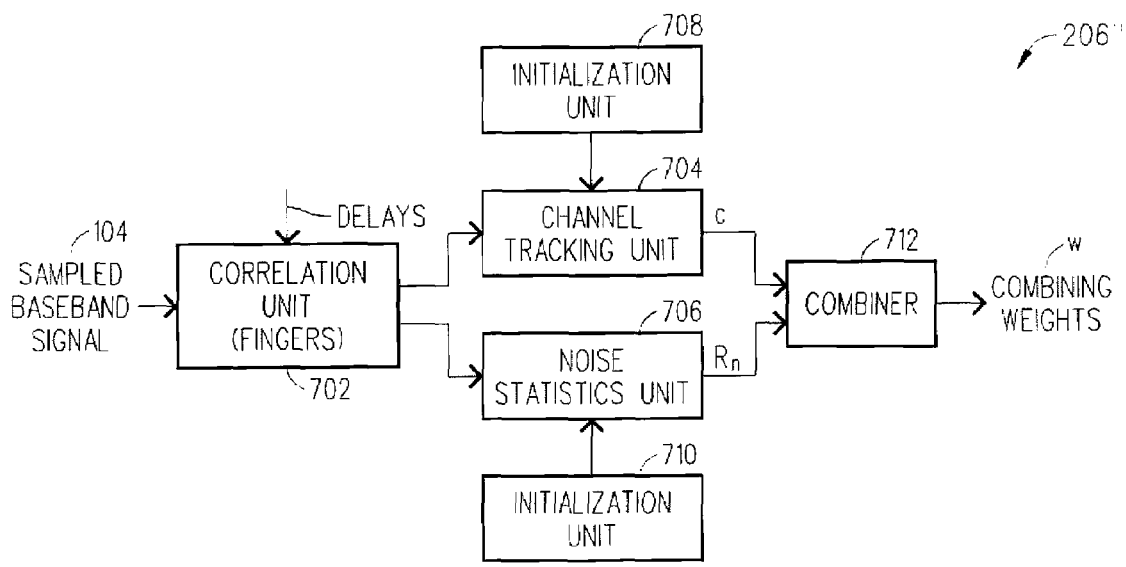
FIG. 7 is a diagram that illustrates in greater detail the components within one embodiment of a weight formation unit that can be used in the baseband processor of a G-RAKE receiver in accordance with the present invention.

An exemplary diagram of a weight formation unit 206" that can be used within a G-RAKE receiver 100 to estimate a noise covariance matrix is shown in FIG. 7. The weight formation unit 206" includes a correlation unit 702, a channel tracking unit 704, a noise statistics unit 706, two initialization units 708 and 710 and a combiner 712. In this embodiment, if $R_n$ denotes the noise covariance matrix, then the combining weights generated by the combiner 712 correspond to the product of the inverse of the noise covariance matrix and a vector of channel coefficient estimates as follows:

$$w=R_n^{-1}c.$$

As described in U.S. Pat. No. 6,363,104 B1, the noise covariance matrix can be replaced by a despread data correlation matrix. Also, as described in an article by W. Hai et al., "Approaches for fast, adaptive, generalized RAKE reception," Research Disclosure Journal, No. 475041, Kenneth Mason Publications Ltd., November 2003, the noise covariance matrix can be replaced by a baseband sample or "chip" sample data correlation matrix. The contents of both of these documents are incorporated by reference herein.

Figure 8:
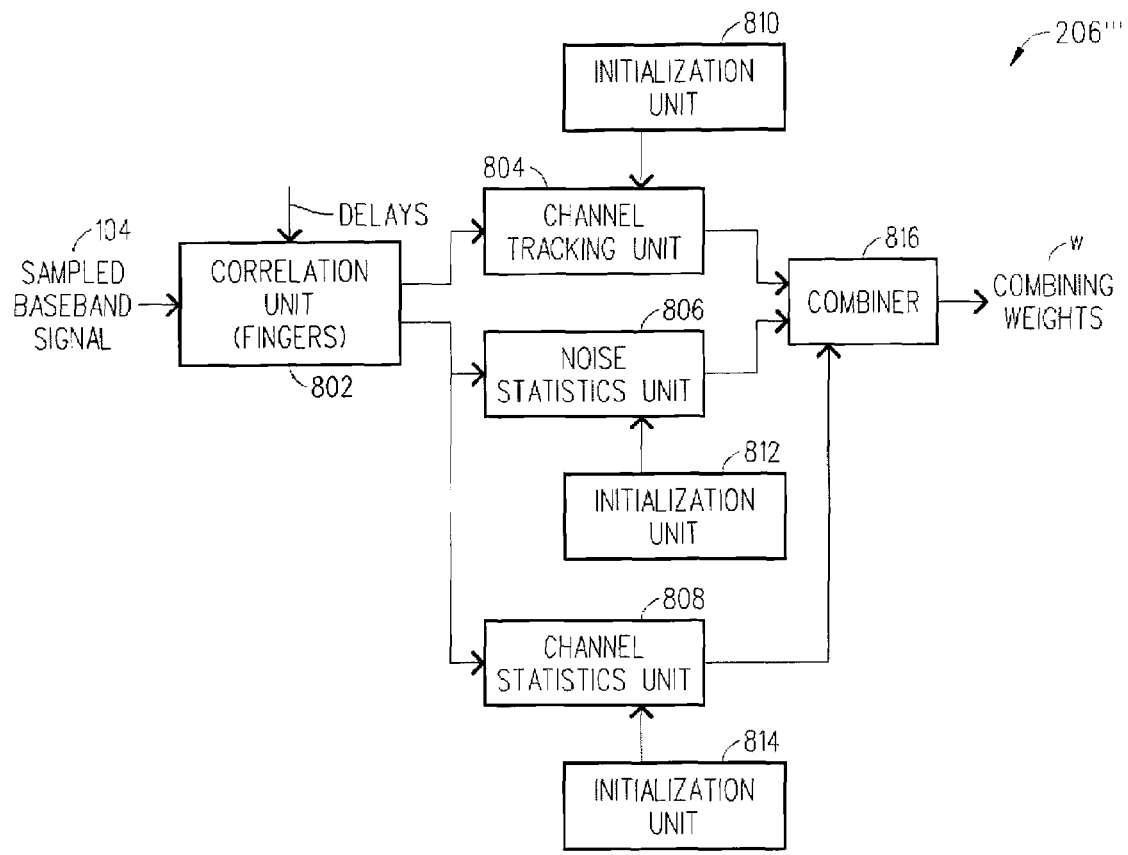
FIG. 8 is a diagram that illustrates in greater detail the components within one embodiment of a weight formation unit that can be used in the baseband processor of a joint scaling RAKE receiver in accordance with the present invention.
Figure 9:
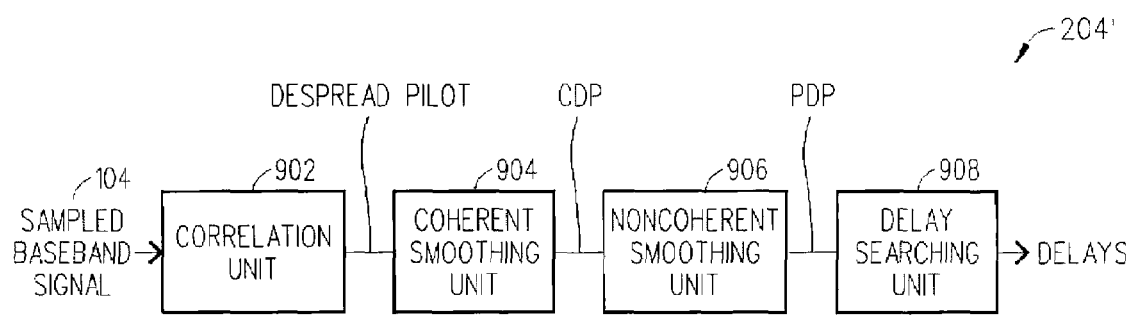
FIG. 9 is a diagram that illustrates in greater detail the components within one embodiment of a finger placement unit that can be used within the baseband processor shown in FIG. 2.

An exemplary diagram of a weight formation unit 206''' that can be used in a joint scaling RAKE receiver 100 to estimate the noise and channel covariance matrices is shown in FIG. 8. The weight formation unit 206''' includes a correlation unit 802, a channel tracking unit 804, a noise statistics unit 806, a channel statistics unit 808, three initialization units 810, 812 and 814 and a combiner 816. In this embodiment, if $R_c$ denotes the channel covariance matrix, and $R_e$ denotes the covariance matrix of the estimation error (usually computed by simply scaling the noise covariance matrix $R_n$), then the combining weights generated by the combiner 816 have the following form:

$$w=[R_n+R_e(R_c+R_e)^{-1}R_c]^{-1}R_c(R_c+R_e)^{-1}c.*$$

* It should be noted that a covariance matrix R is referred to hereinafter as either the noise or channel covariance matrix.

The estimation of the covariance matrices described above can be done by smoothing multiple measurements over time. For instance, if R(n−1) indicates the smoothed covariance matrix and $R_i(n)$ is the instantaneous measurement, then the covariance matrix can be updated as $R(n)=\lambda R(n-1)+(1-\lambda)R_i(n)$ where $\lambda$ is the forgetting factor. And, when a new finger position is used, a new row and column in R(n) is effectively created. This row or column needs initial values that can be initialized from elements in R(n) or R(n−1) corresponding to existing finger positions. With the present invention, the initial values are obtained by interpolating correlation values corresponding to existing/old fingers. For the diagonal element, interpolation using the diagonal elements of nearby fingers can be used. Linear interpolation can be used. For the off-diagonal elements, one can initialize the correlation of the new finger position to position x1 using correlations of nearby fingers to position x1. Again, this can be done by linear interpolation.

Sometimes, noise correlations between fingers are only a function of relative finger delays, not absolute finger delays. In this case, one can interpolate the noise correlation values that correspond to nearby relative delays. For instance, consider the exemplary scenario of FIG. 6 and indicate with R the covariance matrix of the old fingers and indicate with R(0) the initial estimate of the covariance matrix of the new finger positions as follows:

$$R = \begin{bmatrix} r_{11} & r_{12} & r_{13} \\ r_{21} & r_{22} & r_{23} \\ r_{31} & r_{32} & r_{33} \end{bmatrix}$$

$$\tilde{R}(0) = \begin{bmatrix} \tilde{r}_{11} & \tilde{r}_{12} \\ \tilde{r}_{21} & \tilde{r}_{22} \end{bmatrix}$$

Then the elements of the R(0) matrix can be computed as follows:

since y1 is an old delay (y1=x1), $\tilde{r}_{11}=r_{11}$;

$\tilde{r}_{22}$ is given by the interpolation of $r_{22}$ and $r_{33}$, or by the interpolation of $r_{11}$, $r_{22}$ and $r_{33}$, depending on the distance between y2 and the old fingers; and $\tilde{r}_{12}$ is given by the interpolation of the know correlation between y1 and x2, and y1 and x3. Note that in this example these correlation values are known because one of the fingers is an old position finger, and the new position is in-between two old fingers.

A description is provided next where AFC parameters are estimated in accordance with the present invention. As described in the incorporated U.S. patent application Ser. No. 09/678,901 entitled "Method and Apparatus for Automatic Frequency Control in a CDMA Receiver", the AFC is estimated and possibly applied separately to each path (finger location). In this patent application, the estimation involves an initial value and smoothing. With the present invention, the initial frequency offset estimate for a new finger location can be obtained by interpolating values from nearby finger locations. Linear interpolation can be used. It may also help if the interpolated value was scaled down by a factor between 0 and 1. This scaling may also be applied when interpolating other quantities, such as channel estimates and fading and noise statistics.

A description is provided next where tracking parameters are estimated in accordance with the present invention. In the case for channel tracking, AFC, and estimation of fading, noise, or data statistics, there may be tracking parameters depending on the tracking or estimation approach used. For example, the channel tracking unit 304, 704 and 804 may have a step size if least-mean square (LMS) tracking is used or a window size if a sliding window average is used. The channel tracking unit 304, 704 and 804 may also include smoothing filters that are designed based on power spectral estimation as described in the incorporated U.S. patent application Ser. No. 09/277,180 entitled "Smoothing Channel Estimates by Spectral Estimation". While for AFC estimation, the channel tracking unit 304, 704 and 804 may have phased-lock loop step sizes. And for fading and noise statistics estimation, the channel tracking unit 304, 704 and 804 could use smoothing parameters that differ for different fingers or finger pairs. With the present invention, all of these parameters or model estimates can be interpolated from existing fingers. In addition, interpolation with possible scaling may be used.

Up to this point, the present invention has been described where the initialization of parameter estimates was performed by using interpolation and existing finger locations. However, the present invention has an alternative embodiment where initialization can be performed by using interpolation and searcher information. To illustrate this, reference is made to FIG. 9 which shows an exemplary diagram of the components within one embodiment of the finger placement unit 204' (searcher 204')(see FIG. 2). The finger placement unit 204' includes a correlation unit 902, a coherent smoothing unit 904, a noncoherent smoothing unit 906 and a delay searching unit 908. In this example, the correlation unit 902 utilizes the delays and the baseband signal 104 to despread certain symbols (pilots) at a range of delay values. Though not required, the delay values are usually on an evenly spaced grid of values, such as delays 1 or ½ chip apart. The coherent smoothing unit 904 processes the despread pilots to produce a complex/delay profile (CDP). The noncoherent smoothing unit 906 then processes the CDP to produce a power/delay profile (PDP). Thereafter, the delay searching unit 908 processes the PDP and outputs delays to the correlation unit 202 and the weight formation unit 206 (see FIG. 2).

In accordance with the present invention, the PDP and the one or more CDPs are stored and used as part of initialization. First, consider the case in which only the most recent CDP is stored. For channel estimate initialization, an interpolation set of nearby CDP delays is formed using, for example, the nearest 4 delays. The CDP values at those 4 delays form an interpolation set that are interpolated using the aforementioned methods to determine an initial channel estimate at the delay corresponding to the new finger position. The interpolation set can be formed by CDP samples that may or may not correspond to previous finger positions. If the new finger position happens to correspond to a delay for which a CDP value is available, then that single CDP value can be used as the initial channel estimate. This is shown in FIG. 10.

Figure 10:
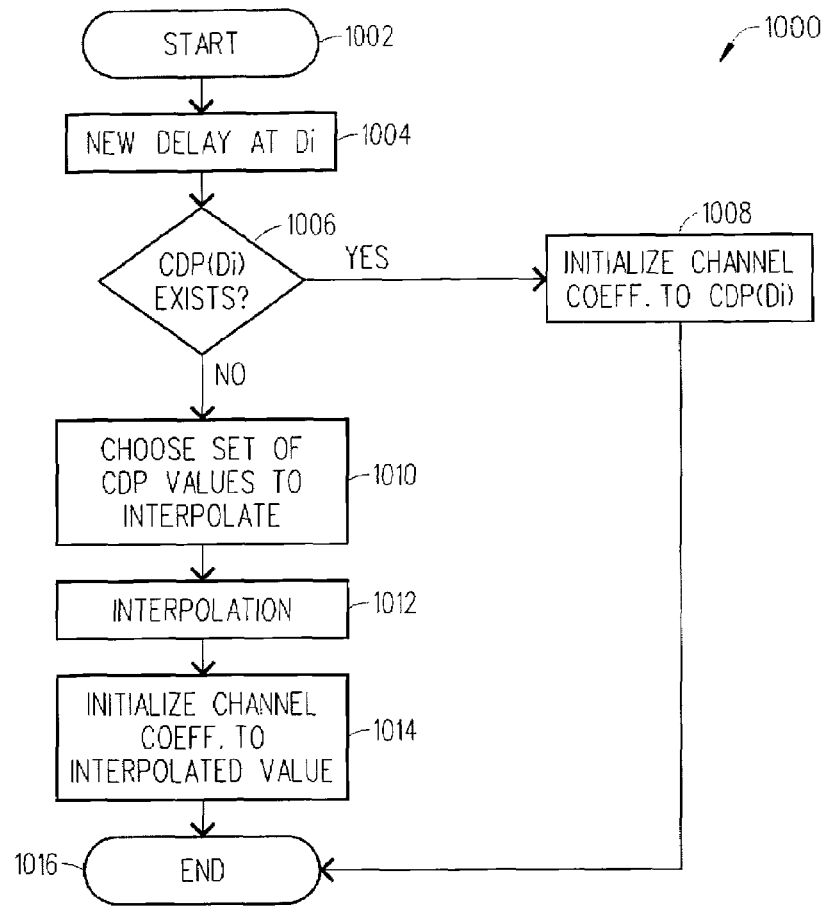
FIG. 10 is a flow chart that shows the steps of a method where initialization of channel coefficients is performed by using the most recent complex/delay profile (CDP) from a finger placement unit in accordance with another embodiment of the present invention.

FIG. 10 illustrates a flow chart that shows the steps of a method 1000 that the weight control unit 206 can use to interpolate and initialize the channel coefficient estimation using the most recent CDP in accordance with the present invention. The process starts at step 1002 and then at step 1004 it is assumed there is a new delay at Di which corresponds to a new finger position. At step 1006, a determination is made at to whether a CDP value exists at Di. If yes, then at step 1008 the channel coefficient is initialized to CDP(Di). If no, then at step 1010 a set of CDP values are chosen so they can be interpolated at step 1012. Thereafter, at step 1014 the channel coefficient associated with the interpolation value is initialized. The process ends at step 1016.

Figure 11:
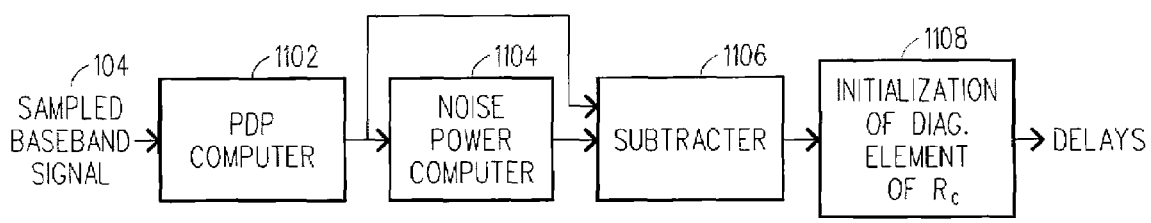
FIG. 11 is a diagram that illustrates the components of a finger placement unit that can be used within the baseband processor of a G-RAKE receiver to initialize noise statistics in accordance with another embodiment of the present invention.

The searcher information can also be used to initialize noise and/or fading statistics for an advanced receiver 100 like a G-RAKE receiver 100 or a joint scaling receiver 100. FIG. 11 is a block diagram illustrating the components within a finger placement unit 204" of a G-RAKE receiver 100 that can use interpolation to initialize the signal statistics. The finger placement unit 204" includes a PDP computer 1102, a noise power computer 1104, a subtracter 1106 and a unit 1108 that initializes the diagonal elements of $R_c$. The PDP computer 1102 interpolates the PDP values to obtain a PDP value for a new delay. The subtracter 1106 then subtracts a noise power estimate from this PDP value and outputs a signal power estimate, which can be used by unit 1108 to initialize the diagonal elements of $R_c$. The off-diagonal elements can be initialized to zero. It should be noted that standard approaches can be used to estimate a noise power using the PDP, such as taking the average. In certain scenarios, such as in the downlink it may help to estimate noise power as a function of delay and then interpolate such values.

Figure 12:
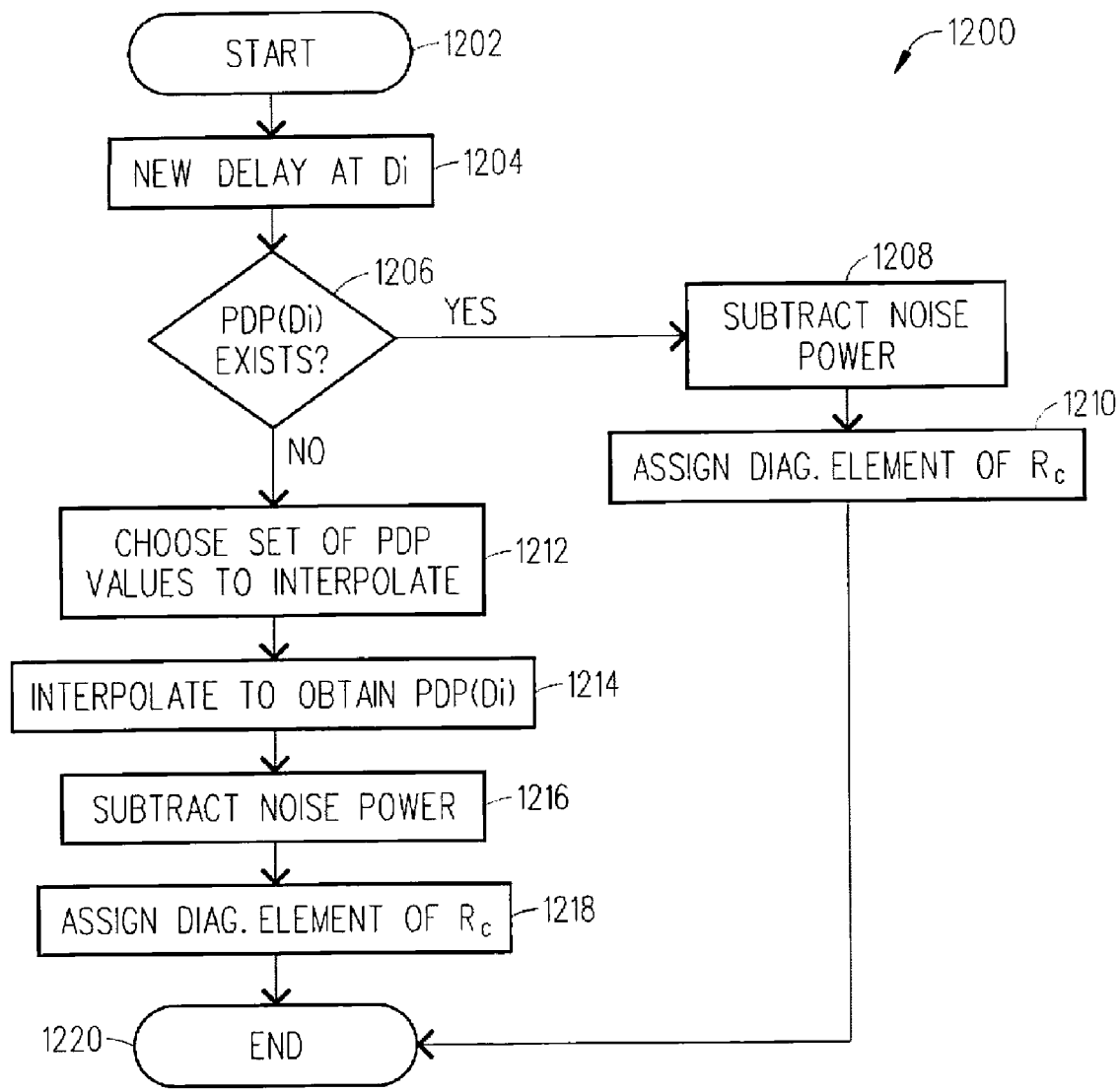
FIG. 12 is a flowchart that shows the steps of a method on how initialization of noise and channel statistics can be performed within a joint scaling RAKE receiver by using interpolation in accordance with yet another embodiment of the present invention.

FIG. 12 is a flowchart illustrating the steps of a method 1200 that can be used in a joint-scaling receiver 100 to interpolate and initialize signal fading statistics. The process starts at step 1202 and then at step 1204 it is assumed there is a new delay at Di which corresponds to a new finger position. At step 1206, a determination is made at to whether a PDP exists at Di. If yes, then at step 1208 the noise power is subtracted from PDP(Di) and at step 1210 a diagonal element of $R_c$ is assigned. If no, then at step 1212 a set of PDP values are chosen so they can be interpolated at step 1214 to obtain PDP(Di). Thereafter, at step 1216 the noise power is subtracted from PDP(Di) and at step 1218 a diagonal element of $R_c$ is assigned. The process ends at step 1220. It should be noted that one can use a weighted sum of a set of PDP values to obtain the PDP at a certain delay even if the PDP value exists at that position.

The case in which multiple CDPs are stored over time is considered next. In this case, to initialize a channel estimate, interpolation can be applied to each CDP to obtain channel measurements at the new finger position over time. These measurements are provided to a standard channel tracking algorithm to produce a channel estimate or prediction for the present time. This estimate can be the initial value used. Examples of channel tracking algorithms that can be used include sliding window averaging, Wiener filtering, Least-Mean Square (LMS), Normalized Least-Mean Square (NLMS), Recursive Least Square (RLS) and Kalman Least-Mean Square (KLMS) tracking. Any form of initialization of these trackers can be used. The interpolated values can also be used to estimate AFC quantities and tracking parameters such as Doppler spread. In addition, channel tracking can be used with the interpolated values to provide a track of the channel at that delay. This track can be used to estimate diagonal and off-diagonal elements of $R_c$ and $R_n$ with the aid of the approaches that are described in the aforementioned U.S. patent application Ser. No. 10/672,127.

Figure 13:
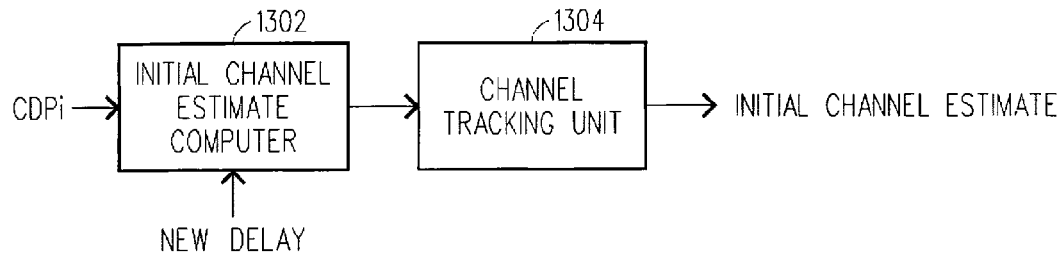
FIG. 13 is a diagram that illustrates the components within an initialization unit shown in FIG. 3 that can use multiple CDP measurements for channel tracking in accordance with another embodiment of the present invention.

FIG. 13 is a block diagram illustrating some of the components within the initialization unit 306 (FIG. 3) that use multiple CDP measurements for channel tracking. As can be seen, CDPi and a new delay are input into an initial channel estimate computer 1302 which is connected to a channel tracking unit 1304 that outputs an initial channel estimate.

Figure 14:
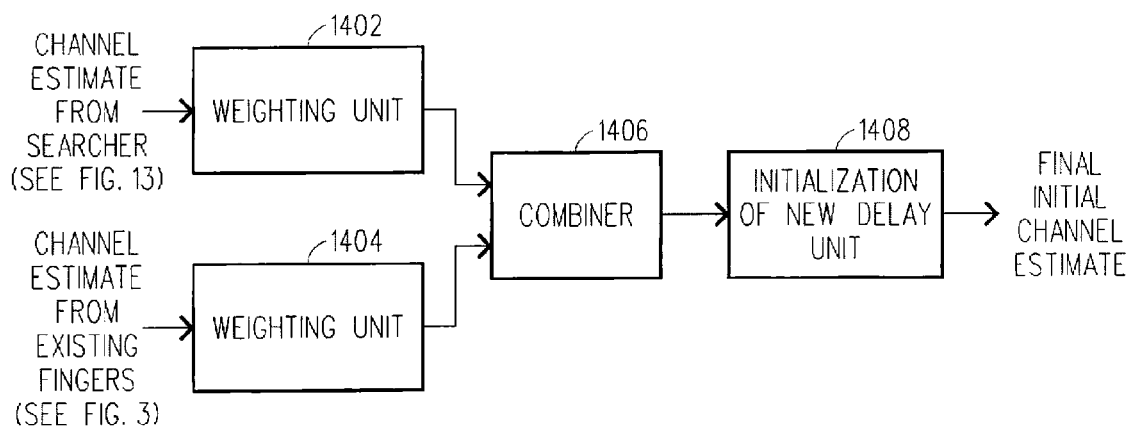
FIG. 14 is a diagram that illustrates the components within a receiver that can be used to combine information from the finger placement unit and the existing fingers in accordance with yet another embodiment of the present invention.

In another embodiment of the present invention, the initialization can be based on a mixture or combination of existing finger information and searcher information. One approach is to select information from one or the other where the selection depends on what information is available from existing fingers. Another approach is based on complexity where one can choose to use the information that requires the least processing to obtain the final initial channel estimate and/or channel statistics. In yet another approach one can combine information from the searcher and from the existing fingers. In this example, an initial channel estimate can be obtained from both the searcher and the existing fingers. And, then the weighted sum of these two can be used as the initial channel estimate. The weights can sum to one and can be the same (0.5 and 0.5) or different to account for which estimate is believed to be noisier (the noisier estimate should have a weight less than 0.5). FIG. 14 is a block diagram that illustrates an exemplary set of components that can be used to combine information in accordance with this approach of the present invention. As shown in FIG. 14, the channel estimate from the searcher (see FIG. 13) is input into a weighting unit 1402 and the channel estimate from existing fingers (see FIG. 3) is input into another weighting unit 1404. The outputs from both weighting units 1402 and 1404 are input to a combiner 1406 which is connected to an initialization of new delay unit 1408 that outputs a final initial channel estimate.

It should be appreciated that combined information can also be used for the initialization of the noise and channel statistics. For example, one can use the information from the searcher 204 to initialize the diagonal elements of the matrices of the noise and fading statistics, and use the information from the existing fingers to initialize the off-diagonal elements, as described in detail above. Also, the weighted sum of information from both sources can be used for the diagonal elements of the matrices. In general, the preferred combination of the information depends on the scenario under consideration and can be determined by using some or all criteria mentioned above: availability, performance and complexity. For instance, in high-speed scenarios, if searcher information is available, one can simply use the CDP values for channel coefficient initialization.

Figure 15:
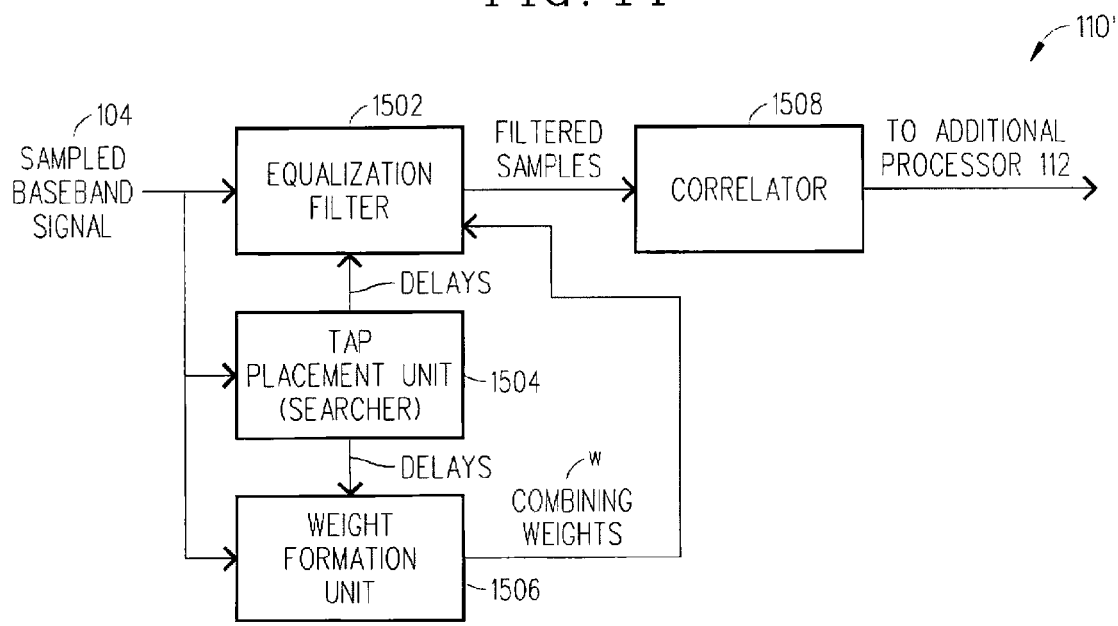
FIG. 15 is a diagram that illustrates an alternative baseband processor that can be used in the receiver shown in FIG. 1.

An alternative structure to the RAKE receiver is the chip equalizer. With chip equalization, the combining weights are used as equalization filter coefficients prior to despreading. FIG. 15 is a diagram that illustrates an alternative embodiment of a baseband processor 110' based on chip equalization. The baseband processor 110' includes an equalization filter 1502, a tap placement unit 1504 (searcher 1504), a weight formation unit 1506, and a correlator 1508. With one form of MMSE chip equalization (for example), the equalization filter 1502 filters or combines baseband samples. This filtering operation is performed using delays or tap positions that are provided by the tap placement unit 1504. The tap placement unit 1504 determines filter tap positions based on traditional location of signal paths. The equalization filter 1502 also uses combining weights provided by weight formation unit 1506. Similar to the RAKE receiver, the weight formation unit can produce combining weights based on channel coefficient estimates. Like the G-RAKE receiver, the weight formation unit may also use a baseband sample data correlation matrix when forming the combining weights. Direct adaptation of the weights is also possible, as described in an article by F. Petré et al., "Pilot-aided adaptive chip equalizer receiver for interference suppression in DS-CDMA forward link," in Proc. IEEE Vehicular Technology Conference, Boston, Mass., Sep. 24-28, 2000. The contents of this document are incorporated by reference herein.

With the chip equalizer structure, the interpolation approaches described previously can also be applied. For example, as tap locations change, interpolation can be used to determine channel coefficient estimates for the new tap locations. For MMSE chip equalization, interpolated data correlation values can also be determined.

From the foregoing, it can be readily appreciated by those skilled in the art that the receiver 100 of the present invention uses interpolation to consider initialization of receiver parameters when finger positions or channel response delay estimates change over time. The receiver parameters that can be estimated include: (1) channel coefficients; (2) AFC parameters; (3) tracking parameters; (4) noise statistics (noise correlations); (5) signal statistics (channel coefficient correlations); (6) data statistics (despread values or chip samples); or (7) combining weights. As described in detail above, the present invention proposes a form of interpolation that uses existing information to provide initial values for the new positions. One type of existing information is the set of existing (old) parameter estimates corresponding to the existing (old) finger positions. Another type of existing information is information generated by a searcher during the search process.

Following are some additional features, advantages and uses of the present invention:

The present invention can be used in WCDMA base stations and terminals.

The present invention can be associated with technology governed in the WCDMA and IS-2000 standards.

The present invention can be used in more advanced receivers that support multiuser detection which requires knowledge of each user's channel response. In this case, the present invention could be used to maintain good channel coefficient estimates for each user when delay estimates for different users change.

The present invention as described herein focused on direct-sequence code-division multiple-access (DS-CDMA) which is used in second and third generation digital cellular systems such as WCDMA, CDMA2000, and IS-95. DS-CDMA is also used in certain WLAN systems. In addition, it should be noted that the present invention can be used to solve the problem of channel tracking with changing delay estimates that can occur in narrowband systems and OFDM systems as well.

It should be appreciated that many components and details associated with the receiver 100 described above are well known in the industry. Therefore, for clarity, the description provided above omitted those well known components and details that are not necessary to understand the present invention.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A receiver adapted to receive and process a radio signal and initialize an initial value of a parameter, the receiver being characterized by means for:
   comparing a new delay of the received signal and an old delay of a previously received signal;
   if the new delay and the old delay are the same, then initializing the initial value of the parameter to be an existing value; and
   if the new delay and the old delay are not the same, then interpolating information and initializing the initial value of the parameter to be the interpolated value, said act of interpolating comprising the acts of:
   defining an interpolation set within which there may be one or more existing values of the parameter that could be used to initialize the initial value of the parameter;
   if the interpolation set is empty, then initializing the initial value of the parameter to be zero or some other value; and,
   if the interpolation set is not empty, then interpolating the one or more existing values of the parameter and initializing the initial value of the parameter to be the interpolated value.

2. The receiver of claim 1, wherein said information used to generate the interpolated value is existing parameter estimates.

3. The receiver of claim 1, wherein said information used to generate the interpolated value is searcher information.

4. The receiver of claim 1, wherein said information used to generate the interpolated value is a combination of existing parameter estimates associated with existing delays and searcher information including at least one of a complex/delay profile (CDP) and a power/delay profile (PDP).

5. The receiver of claim 1, wherein said interpolating includes linear interpolating.

6. The receiver of claim 1, wherein said interpolating includes Wiener interpolating.

7. The receiver of claim 1, wherein said parameter is a channel coefficient.

8. The receiver of claim 1, wherein said parameter is an automatic frequency correction (AFC) parameter.

9. The receiver of claim 1, wherein said parameter is a tracking parameter.

10. receiver of claim 1, wherein said parameter is a noise statistic.

11. receiver of claim 1, wherein said parameter is a signal statistic.

12. The receiver of claim 1, wherein said parameter is a combining weight.

13. The receiver of claim 1, wherein said parameter is a data statistic.

14. The receiver of claim 13, wherein said data statistic corresponds to received sample data.

15. The receiver of claim 13, wherein said data statistic corresponds to despread data.

16. The receiver of claim 1, wherein said receiver is a RAKE receiver.

17. The receiver of claim 1, wherein said receiver is a chip equalizer.

18. The receiver of claim 1, wherein said new delay associated with the received radio signal corresponds with a new finger position when said receiver is a RAKE receiver.

19. The receiver of claim 1, wherein said new delay associated with the received radio signal corresponds with a new tap position when said receiver is a chip equalizer.

20. A wireless communication system comprising:
   a transmitter adapted to transmit a radio signal; and
   a receiver including:
      an antenna for receiving the radio signal;
      a radio frequency (RF) processor for processing the radio signal; and
      a baseband processor for initializing an initial value of a parameter, characterized by means for carrying out the following steps:
         comparing a new delay of the received signal and an old delay of a previously received signal;
         if the new delay and the old delay are the same, then initializing the initial value of the parameter to be an existing value; and if the new delay and the old delay are not the same, then performing the following steps:
defining an interpolation set within which there may be one or more existing values of the parameter that could be used to initialize the initial value of the parameter;
if the interpolation set is empty, then initializing the initial value of the parameter to be zero or some other value; and
if the interpolation set is not empty, then interpolating the one or more existing values of the parameter and initializing the initial value of the parameter to be the interpolated value.

21. The wireless communication system of claim 20, wherein said baseband processor includes a weight formation unit for initializing the initial value of the parameter.

22. The wireless communication system of claim 20, wherein said baseband processor is adapted to use linear interpolation to initialize the initial value of the parameter when the new delay and the old delay are not the same.

23. The wireless communication system of claim 20, wherein said baseband processor is adapted to use Wiener interpolation to initialize the initial value of the parameter when the new delay and the old delay are not the same.

24. The wireless communication system of claim 20, wherein said parameter is at least one of:
a channel coefficient;
an automatic frequency correction (AFC) parameter;
a tracking parameter;
a noise statistic;
a signal statistic;
a data statistic; and
a combining weight.

25. A method for parameter initialization in a radio signal receiver, said method comprising the steps of:
estimating a delay associated with a received radio signal; and
initializing an initial value of a parameter characterized by the steps of:
comparing a new delay of the received signal and an old delay of a previously received signal;
if the new delay and the old delay are the same, then initializing the initial value of the parameter to be an existing value; and
if the new delay and the old delay are not the same, then performing the following steps:
defining an interpolation set within which there may be one or more existing values of the parameter that could be used to initialize the initial value of the parameter;
if the interpolation set is empty, then initializing the initial value of the parameter to be zero or some other value; and
if the interpolation set is not empty, then interpolating the one or more existing values of the parameter and initializing the initial value of the parameter to be the interpolated value.

26. The method of claim 25, wherein said interpolating step is a linear interpolating step.

27. The method of claim 25, wherein said interpolating step is a Wiener interpolating step.

28. The method of claim 25, wherein said parameter is at least one of:
a channel coefficient;
an automatic frequency correction (AFC) parameter;
a tracking parameter;
a noise statistic;
a signal statistic;
a data statistic; and
a combining weight.

29. A receiver that receives and processes a radio signal and when there is a change in a delay associated with the received radio signal initializes diagonal elements of a channel covariance matrix ($R_c$) characterized by means for:
determining if a power/delay profile (PDP) value exist at the new delay associated with the received radio signal;
if the PDP value exist, then subtracting noise power from the PDP value and assigning the resulting subtracted value to the diagonal elements of the channel covariance matrix; and
if the PDP value does not exist, then performing the following steps:
choosing a set of previous PDP values;
interpolating the previous PDP values to obtain an interpolated PDP value;
subtracting noise power from the interpolated PDP value; and
assigning the resulting subtracted value to the diagonal elements of the channel covariance matrix.

* * * * *

UNITED STATES PATENT AND TRADEMARK OFFICE
CERTIFICATE OF CORRECTION

PATENT NO. : 7,558,533 B2  
APPLICATION NO. : 11/936193  
DATED : July 7, 2009  
INVENTOR(S) : Cozzo et al.

Page 1 of 1

It is certified that error appears in the above-identified patent and that said Letters Patent is hereby corrected as shown below:

In the drawing: Fig. 5, Sheet 2 of 7, for TAG "514", Line 2, delete "INTERPO_ATION" and insert -- INTERPOLATION --, therefor.

Column 5, Line 3, delete "yl" and insert -- y1 --, therefor.

Column 12, Line 32, in Claim 10, before "receiver", insert -- The --.

Column 12, Line 34, in Claim 11, before "receiver", insert -- The --.

Signed and Sealed this

Twenty-fourth Day of November, 2009

David J. Kappos
*Director of the United States Patent and Trademark Office*